United States Patent
Ohmura

(10) Patent No.: US 10,281,021 B2
(45) Date of Patent: May 7, 2019

(54) POWER SYSTEM AND METHOD OF MANUFACTURING THE SAME

(71) Applicant: HONDA MOTOR CO., LTD., Tokyo (JP)

(72) Inventor: Jun Ohmura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/836,127

(22) Filed: Dec. 8, 2017

(65) Prior Publication Data

US 2018/0172130 A1 Jun. 21, 2018

(30) Foreign Application Priority Data

Dec. 20, 2016 (JP) .................... 2016-247120

(51) Int. Cl.
*F16H 48/08* (2006.01)
*F16H 48/42* (2012.01)
(Continued)

(52) U.S. Cl.
CPC .............. *F16H 48/08* (2013.01); *B60K 1/00* (2013.01); *B60K 6/365* (2013.01); *B60K 6/405* (2013.01); *B60K 17/08* (2013.01); *B60K 17/16* (2013.01); *B60K 17/165* (2013.01); *B60L 15/2045* (2013.01); *F16H 1/36* (2013.01); *F16H 48/42* (2013.01); *B60K 2001/001* (2013.01); *F16H 2048/087* (2013.01); *F16H 2048/426* (2013.01);
(Continued)

(58) Field of Classification Search
CPC .............. B60K 6/365; B60K 2001/001; F16H 2048/087; F16H 2200/0021
See application file for complete search history.

(56) References Cited

U.S. PATENT DOCUMENTS 6,864,607 B2 * 3/2005 Hashimoto .............. B60K 1/00
180/65.1
2003/0196842 A1 10/2003 Hashimoto
(Continued)

FOREIGN PATENT DOCUMENTS

JP 2002-104001 A 4/2002
JP 2003-312282 A 11/2003

OTHER PUBLICATIONS

Jun. 5, 2018, Japanese Office Action issued for related JP Application No. 2016-247120.

*Primary Examiner* — Brian L Swenson
(74) *Attorney, Agent, or Firm* — Paratus Law Group, PLLC

(57) ABSTRACT

A power system includes an electric motor, a transmission, and a differential gear system. The transmission includes a first gear that is mechanically connected to the electric motor, a second gear that has a rotation axis in common with the first gear and is mechanically connected to a differential gear casing of the differential gear system, a pinion gear that meshes with the first gear and the second gear, and a pinion holder that rotatably supports the pinion gear. The pinion holder has a pinion gear supporting portion which is disposed on a side of the differential gear casing of the differential gear system to support the pinion gear, relative to a meshing portion between the second gear and the pinion gear. An inner diameter of the second gear at the meshing portion is equal to or smaller than an outer diameter of the pinion holder.

6 Claims, 8 Drawing Sheets

(51) Int. Cl.
*F16H 1/36* (2006.01)
*B60L 15/20* (2006.01)
*B60K 17/16* (2006.01)
*B60K 6/365* (2007.10)
*B60K 6/405* (2007.10)
*B60K 1/00* (2006.01)
*B60K 17/08* (2006.01)

(52) U.S. Cl.
CPC ... *F16H 2200/0021* (2013.01); *Y02T 10/7275* (2013.01)

(56) References Cited

U.S. PATENT DOCUMENTS

| | | | | |
|---|---|---|---|---|
| 2009/0127954 | A1* | 5/2009 | Mogi | B60K 17/12 310/90 |
| 2011/0175475 | A1* | 7/2011 | Makino | B60K 1/00 310/78 |
| 2012/0299419 | A1* | 11/2012 | Tanaka | F16H 57/0476 310/90 |
| 2013/0178322 | A1* | 7/2013 | Takuno | F16H 1/32 475/178 |
| 2015/0045170 | A1* | 2/2015 | Ohmura | F16H 48/42 475/221 |

\* cited by examiner

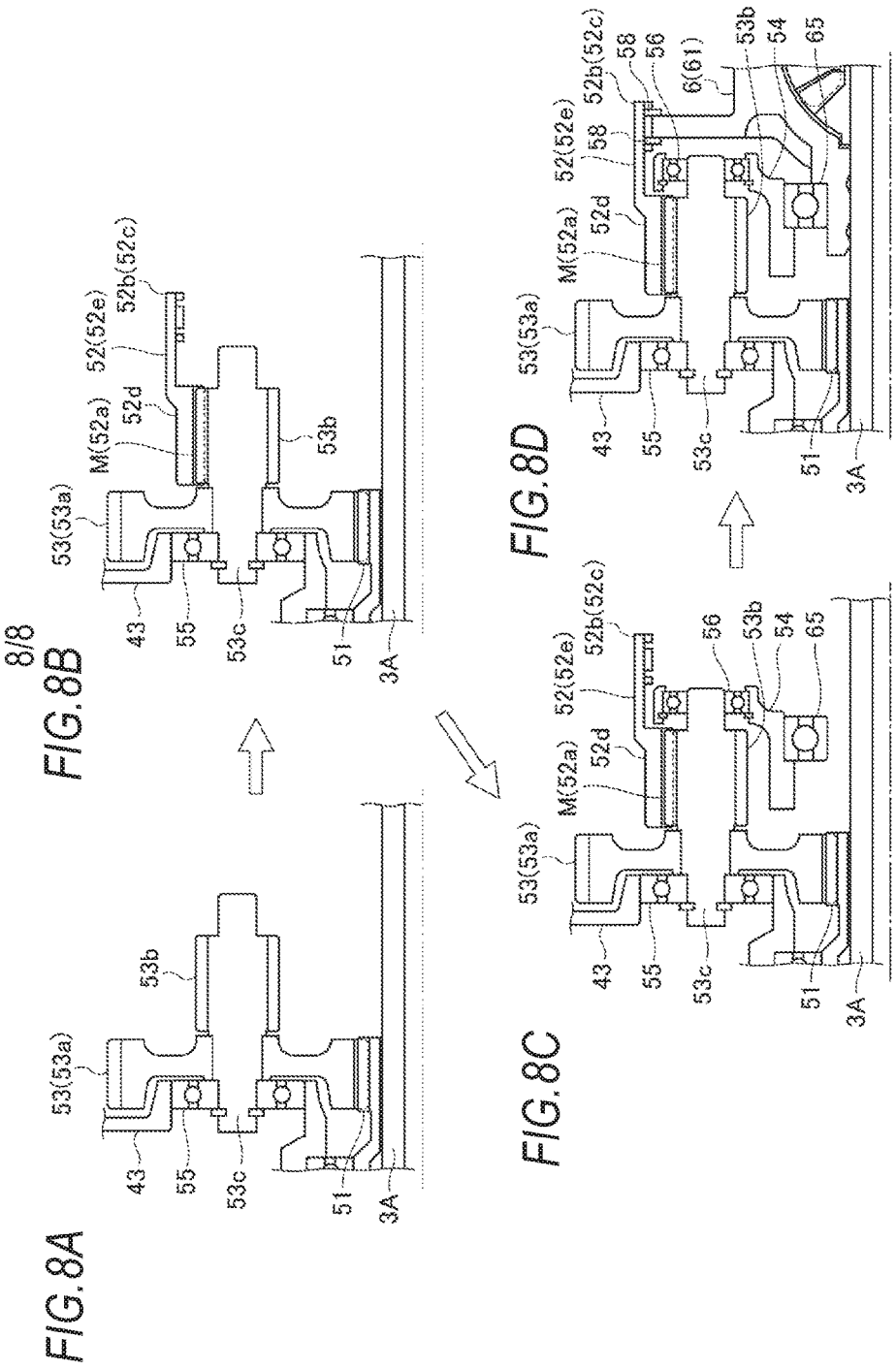

POWER SYSTEM AND METHOD OF MANUFACTURING THE SAME

CROSS-REFERENCE TO RELATED APPLICATION(S)

This application claims priority from Japanese Patent Application No. 2016-247120 filed on Dec. 20, 2016, the entire contents of which are incorporated herein by reference.

FIELD

The present invention relates to a power system that is provided in an electric motor vehicle and a method of manufacturing the power system.

BACKGROUND

A power system is disclosed in JP-A-2002-104001 which includes an electric motor for driving a left wheel and a right wheel of a vehicle, a transmission that is disposed on power transmission paths between the electric motor and the left wheel and the electric motor and the right wheel, and a differential gear system that distributes output power shifted by the transmission to the left wheel and the right wheel. This type of power system is provided in an electric motor vehicle such as a hybrid vehicle or an electric vehicle, as a front wheel drive system or a rear wheel drive system, and it is important for appropriate power transmission how to support gears constituting the transmission. Also, it is desired that the power system is minimized.

However, no specific description is given in JP-A-2002-104001 with respect to the support of the gears constituting the transmission and the minimizing of the power system.

SUMMARY

The invention is to provide a power system in which a pinion holder for holding a pinion gear is appropriately disposed to realize appropriate power transmission and the size thereof can be minimized, and a method of manufacturing the power system.

The invention provides following aspects (1) to (6).

(1) A power system (e.g., a power system 1 in an embodiment to be described below) including:

an electric motor (e.g., an electric motor 2 in an embodiment) that drives a left wheel and a right wheel of a vehicle;

a transmission (e.g., a transmission 5 in an embodiment) that is disposed on power transmission paths between the electric motor and the left wheel and between the electric motor and the right wheel; and a differential gear system (e.g., a differential gear system 6 in an embodiment) that distributes output power shifted by the transmission to the left wheel and the right wheel, wherein:

the transmission includes a first gear (e.g., a first gear 51 in an embodiment) that is mechanically connected to the electric motor, a second gear (e.g., a second gear 52 in an embodiment) that has a rotation axis in common with the first gear and is mechanically connected to a differential gear casing (e.g., a differential gear casing 61 in an embodiment) of the differential gear system, a pinion gear (e.g., a pinion gear 53 in an embodiment) that meshes with the first gear and the second gear, and a pinion holder (e.g., a pinion holder 54 in an embodiment) that rotatably supports the pinion gear:

the pinion holder has a pinion gear supporting portion (e.g., a pinion gear supporting portion 54a in an embodiment) which is disposed on a side of the differential gear casing of the differential gear system to support the pinion gear, relative to a meshing portion (e.g., a meshing portion M in an embodiment) between the second gear and the pinion gear; and an inner diameter (e.g., an inner diameter R1 in an embodiment) of the second gear at the meshing portion is equal to or smaller than an outer diameter (e.g., an outer diameter R2 in an embodiment) of the pinion holder.

(2) The power system according to (1), wherein the pinion gear is configured such that one end of a pinion shaft (e.g., a pinion shaft 53c in an embodiment) is rotatably supported on a partition wall portion (e.g., a partition wall 43 in an embodiment) through a first bearing (e.g., a bearing 55 in an embodiment) and an other end thereof is rotatably supported on the pinion gear supporting portion of the pinion holder through a second bearing (e.g., a bearing 56 in an embodiment), and the pinion holder is fixed to the partition wall portion.

(3) The power system according to (1) or (2), wherein the pinion gear includes a large diameter gear (e.g., a large diameter gear 53a in an embodiment) and a small diameter gear (e.g., a small diameter gear 53b in an embodiment), and the small diameter gear meshes with the second gear.

(4) The power system according to any one of (1) to (3), wherein the differential gear casing of the differential gear system has an input plate (e.g., an input plate 61b in an embodiment) that extends in a radial direction and is mechanically connected to the second gear, and the inner diameter (e.g., an inner diameter R3 in an embodiment) of the second gear at a connecting portion (e.g., a connecting portion 52b in an embodiment) between the second gear and the input plate is larger than the outer diameter of the pinion holder.

(5) The power system according to (4), wherein the second gear includes a second-gear large diameter portion (e.g., a second-gear large diameter portion 52c in an embodiment) constituting the connecting portion, a second-gear small diameter portion (e.g., a second-gear small diameter portion 52d in an embodiment) constituting the meshing portion, and a second gear connecting portion (e.g., a second gear connecting portion 52e in an embodiment) connecting the second-gear large diameter portion with the second-gear small diameter portion, and an outer diameter of the second-gear small diameter portion is smaller than an outer diameter of the second-gear large diameter portion.

(6) A method of manufacturing a power system (e.g., the power system 1 in an embodiment), wherein the power system includes:

an electric motor (e.g., an electric motor 2 in an embodiment) that drives a left wheel and a right wheel of a vehicle;

a transmission (e.g., a transmission 5 in an embodiment) that is disposed on power transmission paths between the electric motor and the left wheel and between the electric motor and the right wheel; and a differential gear system (e.g., a differential gear system 6 in an embodiment) that distributes output power shifted by the transmission to the left wheel and the right wheel, the transmission includes:

a first gear (e.g., a first gear 51 in an embodiment) that is mechanically connected to the electric motor;

a second gear (e.g., a second gear 52 in an embodiment) that has a rotation axis in common with the first gear and is mechanically connected to a differential gear casing (e.g., a differential gear casing 61 in an embodiment) of the differential gear system;

a pinion gear (e.g., a pinion gear 53 in an embodiment) that meshes with the first gear and the second gear; and a pinion holder (e.g., a pinion holder 54 in an embodiment) that rotatably supports the pinion gear, the pinion holder has a pinion gear supporting portion (e.g., a pinion gear supporting portion 54a in an embodiment) which is disposed on a side of the differential gear casing of the differential gear system to support the pinion gear, relative to a meshing portion (e.g., a meshing portion M in an embodiment) between the second gear and the pinion gear, and the method comprises:

assembling the pinion gear, the second gear, the pinion holder, and the differential gear system in this order after assembling the first gear.

According to aspect (1), since the pinion holder has the pinion gear supporting portion which is disposed on the side of differential gear casing of the differential gear system to support the pinion gear, relative to the meshing portion between the second gear mechanically connected to the differential gear casing of the differential gear system and the pinion gear, the pinion gear can be appropriately supported. This enables appropriate power transmission from the pinion gear to the second gear.

In addition, since the inner diameter of the second gear in the meshing portion with the pinion gear is equal to or smaller than the outer diameter of the pinion holder, this can reduce the size in the radial direction around the pinion gear while improving the degree of freedom in layout around the pinion holder.

According to aspect (2), since the pinion holder for supporting the other end of the pinion shaft is fixed to the partition wall for supporting one end of the pinion shaft, the partition wall portion has both the support function of the pinion shaft and the support function of the pinion holder, so that the components can be used in common and thus the number of components can be reduced.

According to aspect (3), since the pinion gear has the large diameter gear and the small diameter gear and the small diameter gear meshes with the second gear, enlargement in dimension in the radial direction can be prevented.

According to aspect (4), since the inner diameter of the second gear at the connecting portion between the second gear and the differential gear casing is larger than the outer diameter of the pinion holder, the pinion holder can be assembled after the second gear is assembled.

According to aspect (5), the second gear includes the second-gear large diameter portion constituting the connecting portion with the differential gear casing, the second-gear small diameter portion constituting the meshing portion with the pinion gear, the outer diameter of the second-gear small diameter portion is smaller than that of the second-gear large diameter portion, and thus it is possible to prevent enlargement in dimension in the radial direction around the pinion gear. Further, the deceleration ratio of the second gear can be increased.

According to aspect (6), since the pinion gear, the second gear, the pinion holder, and the differential gear system are assembled in this order after the first gear is assembled, it is possible to improve the degree of freedom in layout around the pinion holder while making it easy to enlarge the bearing and secure a lubrication path around the pinion holder.

BRIEF DESCRIPTION OF DRAWINGS

FIGS. 8A to 8D are explanatory diagrams illustrating assembling procedures of a transmission and the differential gear system, wherein FIG. 8A is an explanatory diagram illustrating the assembling of the pinion gear, FIG. 8B is an explanatory diagram illustrating the assembling of the second gear, FIG. 8C is an explanatory diagram illustrating the assembling of the pinion holder, and FIG. 8D is an explanatory diagram illustrating the assembling of the differential gear system.

DETAILED DESCRIPTION

A power system 1 according to an embodiment of the invention will be described with reference to FIGS. 1 to 7 and FIGS. 8A to 8D.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

[Power System]

Figure 1:
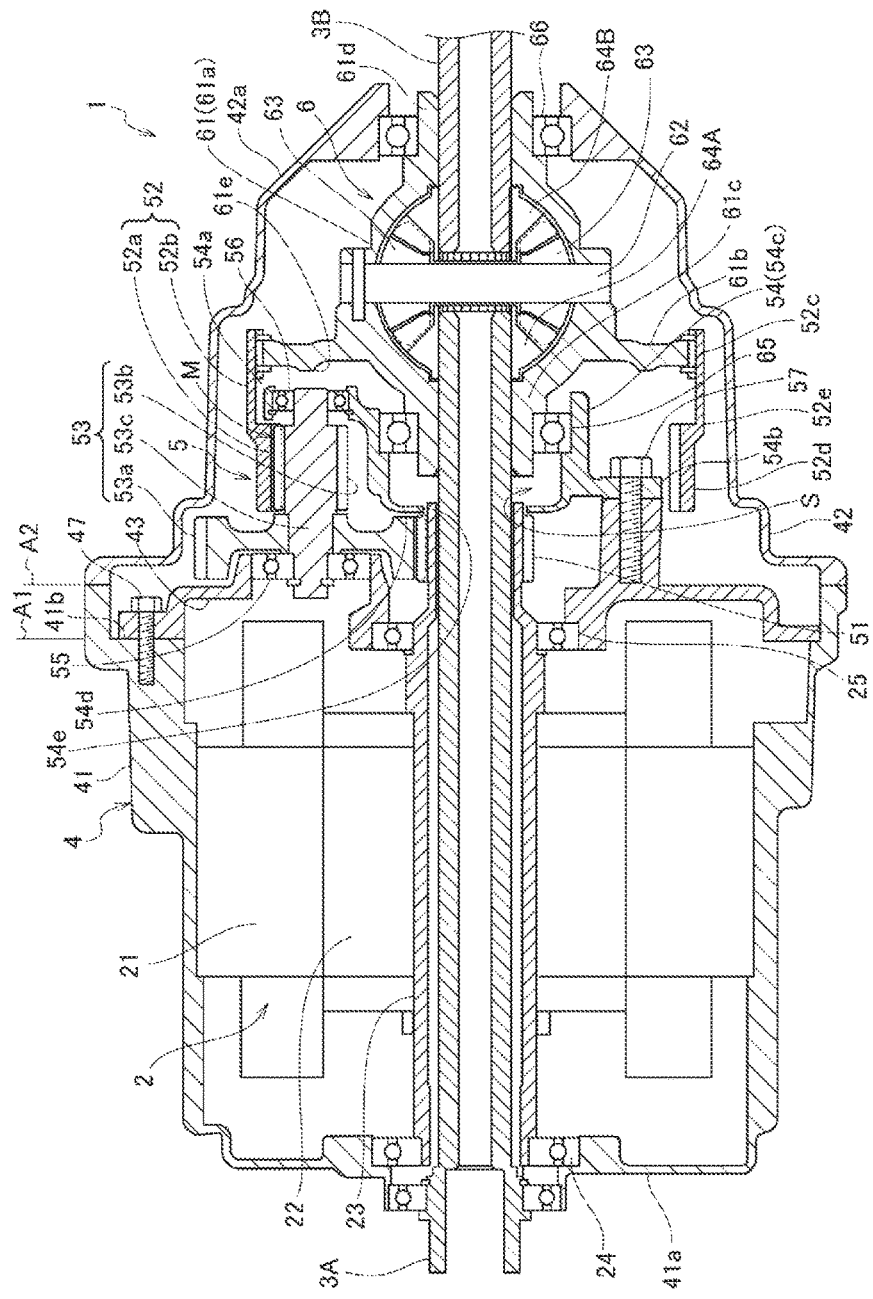
FIG. 1 is a sectional view of a power system according to an embodiment of the invention, and a sectional view taken along line A-A in FIG. 2.

In FIG. 1, reference numerals 3A and 3B indicate left and right axles, which are coaxially disposed in a vehicle width direction. In the power system 1, a housing 4 has the entire shape formed into a substantially cylindrical shape, and includes therein the electric motor 2 for driving the axles, a transmission 5 that decelerates driving rotation of the electric motor 2, and a differential gear system 6 that distributes the driving rotation decelerated by the transmission 5 to the axles 3A and 3B.

Figure 2:
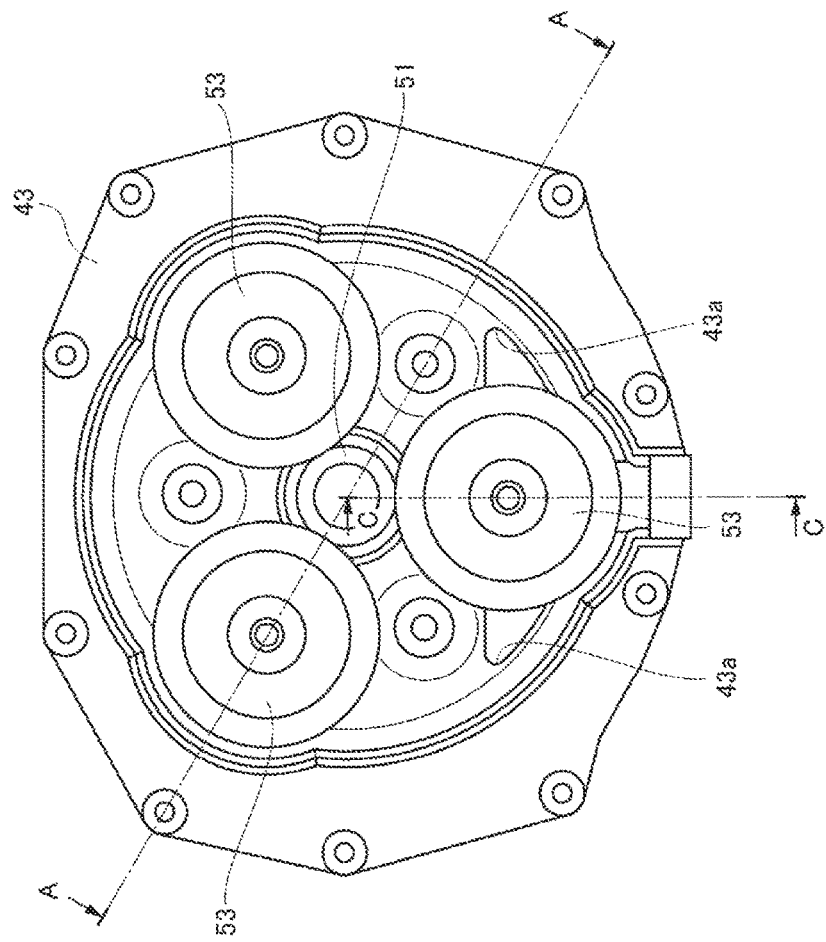
FIG. 2 is a side view of a partition wall and a pinion gear inside the power system when viewed from a differential gear system side.

The housing 4 includes a first casing 41 for accommodating the electric motor 2 and a second casing 42 for accommodating the transmission 5 and the differential gear system 6. A partition wall 43 is provided at a boundary between the first casing 41 and the second casing 42, and an internal space of the first casing 41 is partitioned from an internal space of the second casing 42 by the partition wall 43. The partition wall 43 is fastened to a step portion 41b provided on an outer peripheral part of the first casing 41 with a bolt 47. Therefore, a mating surface A1 of the first casing 41 and the partition wall 43 is located closer to the first casing 41 relative to a mating surface A2 of the first casing 41 and the second casing 42. A bottom of the housing 4 functions as a storage portion 44 for storing lubricating oil (liquid medium), and the lubricating oil is stored up to a stationary oil level L illustrated in FIG. 6. The stationary oil level L is set lower than an air gap G of the electric motor 2 (a clearance secured between an inner periphery of a stator 21 and an outer periphery of a rotor 22 to be described below) so as to reduce an agitation loss of the lubricating oil in the electric motor 2. As also illustrated in FIG. 2, a communication port 43a is formed in a lower part of the partition wall 43 to allow the lubricating oil to flow therethrough.

[Electric Motor]

The electric motor 2 includes the stator 21 fixed to an inner peripheral part of the first casing 41 and the rotor 22 disposed rotatably on the inner periphery of the stator 21. A rotor shaft 23 is coupled to an inner peripheral part of the rotor 22 so as to surround an outer periphery of one axle 3A, and the rotor shaft 23 is supported on an end wall 41a of the first casing 41 and the partition wall 43 through bearings 24 and 25 so as to be relatively rotable coaxially with the axle 3A. In addition, one end of the axle 3A and the rotor shaft 23 penetrates the partition wall 43 and extends into the second casing 42, and the other end of the axle 3A penetrates the end wall 41a of the first casing 41 and extends to the outside of the housing 4.

[Transmission]

The transmission 5 includes a first gear 51 mechanically connected to the electric motor 2, a second gear 52 having the same rotation axis as that of the first gear 51 and mechanically connected to a differential gear casing 61 of the differential gear system 6, a plurality of pinion gears 53 meshing with the first gear 51 and the second gear 52, and a pinion holder 54 for supporting the plurality of pinion gears 53 to be rotatable and not to revolve, and the decelerated driving rotation is output to the differential gear casing 61 of the differential gear system 6 through the pinion gear 53 and the second gear 52 when the driving rotation of the electric motor 2 is input from the first gear 51.

The first gear 51 is an external gear, and is formed integrally with the rotor shaft 23. The pinion gear 53 includes a large diameter gear 53a which is an external gear, a small diameter gear 53b which is an external gear, and an pinion shaft 53c which supports the large diameter gear 53a and the small diameter gear 53b in an integrally rotatable manner. The large diameter gear 53a is coupled to the pinion shaft 53c on a side of the electric motor 2, and meshes with the first gear 51. In addition, the small diameter gear 53b is formed integrally with the pinion shaft 53c on a side of the differential gear system 6, and meshes with the second gear 52. An end of the pinion shaft 53c on the side of the electric motor 2 is rotatably supported on the partition wall 43 through the bearing 55, and an end thereof on the side of the differential gear system 6 is rotatably supported on a pinion gear supporting portion 54a of the pinion holder 54 through the bearing 56.

As illustrated in FIG. 2, the transmission 5 of the embodiment includes three pinion gears 53. The three pinion gears 53 are disposed at equal intervals (intervals of 120°) in a circumferential direction around the first gear 51. At least one of the three pinion gears 53 is partially or entirely located in the storage portion 44 described above, and functions as a rotating body that splashes up the lubricating oil stored in the storage portion 44 with the rotation caused by the driving of the electric motor 2. In the example illustrated in FIG. 2, the lowermost pinion gear 53 disposed immediately below the first gear 51 functions as a rotating body for splashing the lubricating oil, and thus the splashed lubricating oil is supplied to two upper pinion gears 53. Here, assuming that the pinion gear 53 rotates in the counterclockwise direction in FIG. 2, the lubricating oil splashed by the rotation of the lowermost pinion gear 53 is mainly supplied to the pinion gear located at an upper left, and then the lubricating oil scattered by the rotation of the pinion gear located at the upper left is mainly further supplied to the pinion gear located at an upper right.

In the second gear 52, a gear portion 52a is an internal gear and meshes with the small diameter gear 53b of the pinion gear 53. The second gear 52 includes a connecting portion 52b extending from the gear portion 52a toward the differential gear system 6 across the outer peripheral side of the pinion holder 54 (pinion gear supporting portion 54a), and the connecting portion 52b is mechanically connected to the differential gear casing 61 of the differential gear system 6 through a spline. In other words, the second gear 52 includes a second-gear large diameter portion 52c constituting the connecting portion 52b with the differential gear casing 61, a second-gear small diameter portion 52d constituting the gear portion 52a meshing with the pinion gear 53, and a second gear connecting portion 52e for connecting the second-gear large diameter portion 52c and the second-gear small diameter portion 52d, and an outer diameter of the second-gear small diameter portion 52d is smaller than that of the second-gear large diameter portion 52c. Further, the second gear 52 has a lower end located in the storage portion 44 described above, and also functions as a rotating body for splashing the lubricating oil stored in the storage portion 44 with the rotation caused by the driving of the electric motor 2.

Figure 3:
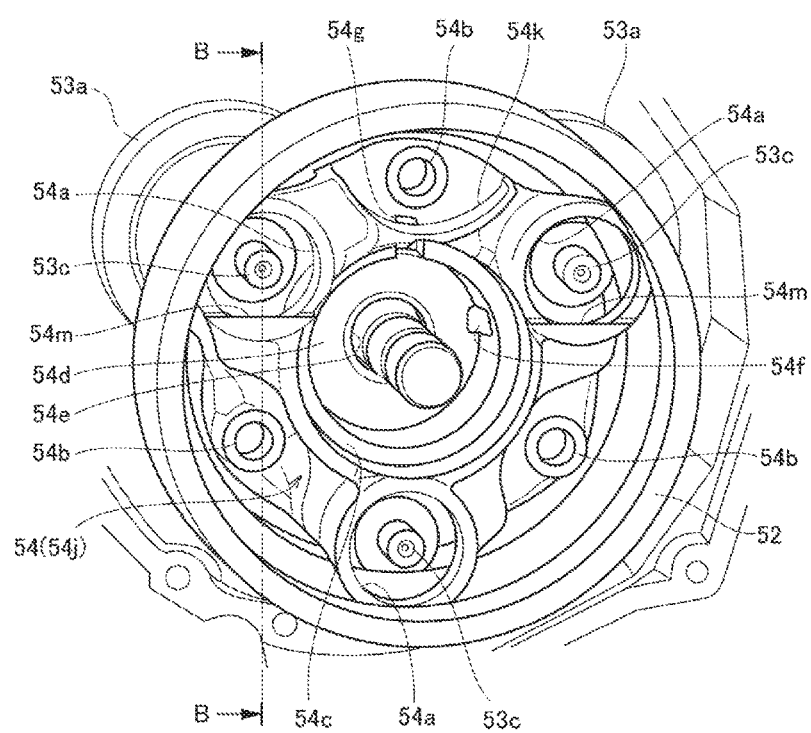
FIG. 3 is a perspective view of the pinion gear, a second gear, and a pinion holder (bearing is not illustrated) when viewed from the differential gear system side.
Figure 4:
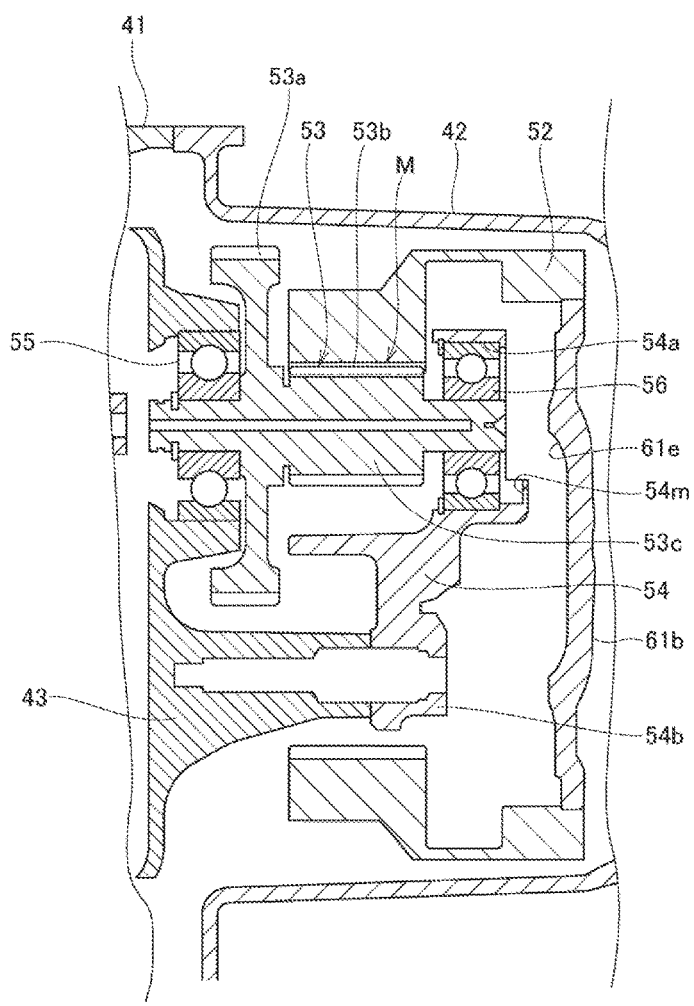
FIG. 4 is a sectional view taken along line B-B in FIG. 3.
Figure 5:
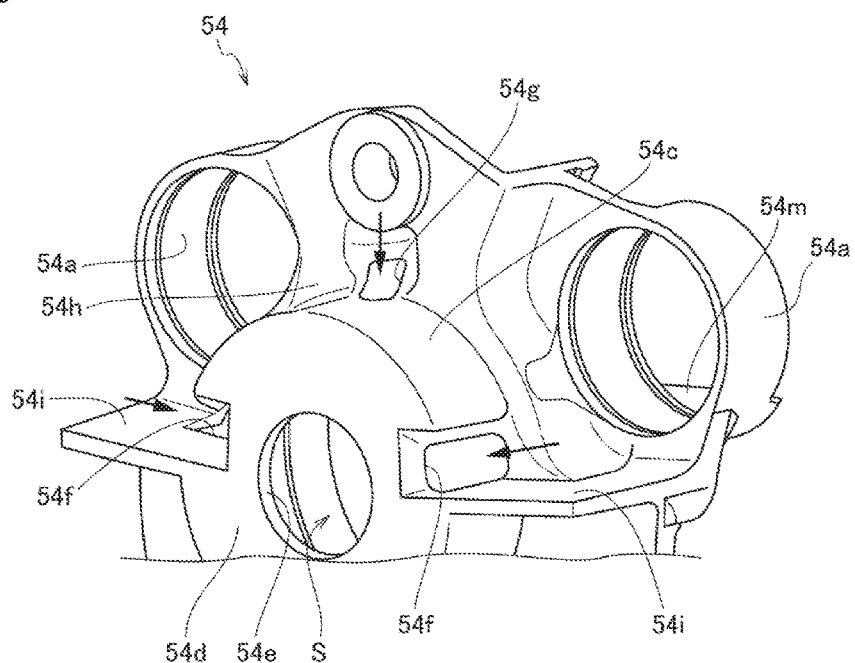
FIG. 5 is a perspective view of a main part of the pinion holder when viewed from the pinion gear side.
Figure 6:
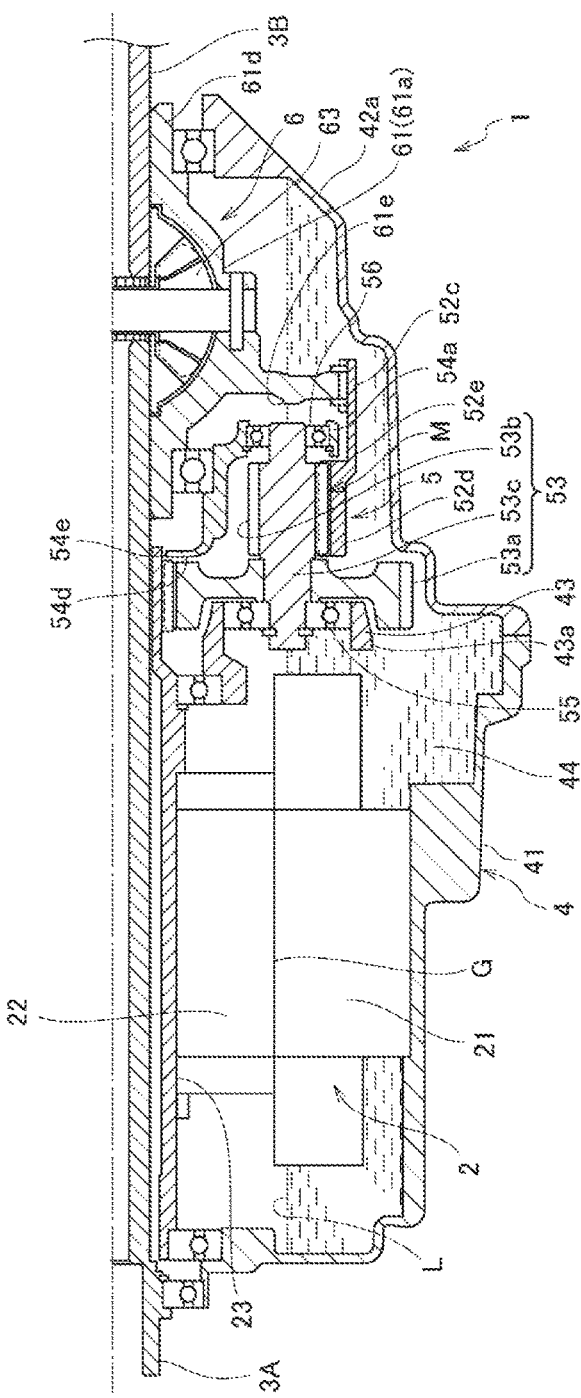
FIG. 6 is a partial sectional view of the power system illustrated in FIG. 1, and is a sectional view taken along line C-C in FIG. 2.

As illustrated in FIGS. 3 to 5, the pinion holder 54 includes three pinion gear supporting portions 54a each of which rotatably supports the pinion shaft 53c of the pinion gear 53 through the bearing 56, three fixed portions 54b that are fixed to the partition wall 43, and a bottomed cylindrical cup portion 54c formed on a center (on an inner diameter side of the pinion gear supporting portion 54a and the fixed portion 54b) of the pinion holder 54.

The pinion gear supporting portion 54a is disposed on the side of the differential gear casing 61 of the differential gear system 6 relative to a meshing portion M between the second gear 52 mechanically connected to the differential gear casing 61 of the differential gear system 6 and the small diameter gear 53b of the pinion gear 53. Thus, the other end of the pinion shaft 53c, in which one end thereof is supported by the partition wall 43 through the bearing 55, is supported by the pinion gear supporting portion 54a through the bearing 56, and thus the pinion gear 53 can be appropriately supported in a state of being held at both sides.

The three fixed portions 54b are located at intermediate portions between the pinion gear supporting portions 54a adjacent to each other in the circumferential direction, and are fastened to the partition wall 43 with bolts 57, respectively. Thereby, the partition wall 43 serves as a support member of the pinion holder 54 as well as a support member of the pinion shaft 53c.

The cup portion 54c surrounds the outer periphery of one axle 3A through the space portion S from one end side to the other end side of the meshing portion M in the axial direction and on the inner peripheral side of the meshing portion M in the radial direction, and the bottom 54d on one end side is provided with a through-hole 54e through which the axle 3A penetrates. In addition, the inner peripheral part on the other end side of the cup portion 54c rotatably supports one end side of the differential gear casing 61 through the bearing 65. Thereby, the pinion holder 54 serves as a support member of the differential gear casing 61 as well as a support member of the pinion gear 53.

[Differential Gear System]

The differential gear system 6 includes the differential gear casing 61, a differential pinion shaft 62, a differential pinion gear 63, and left and right side gears 64A and 64B so as to allow difference in rotation of the left and right axles 3A and 3B while distributing the driving rotation, which is input to the differential gear casing 61 from the second gear 52, to the left and right axles 3A and 3B.

The differential gear casing 61 includes a spherical differential gear casing body 61a that accommodates the differential pinion shaft 62, the differential pinion gear 63, and the left and right side gears 64A and 64B, an input plate 61b that extends in the radial direction from the outer periphery of the differential gear casing body 61a and is mechanically connected to the second gear 52, and left and right extension portions 61c and 61d that extend in the axial direction from both sides of the differential gear casing body 61a. One extension portion 61c rotatably supports the one axle 3A at an inner peripheral part thereof, and an outer peripheral part thereof is rotatably supported by the pinion holder 54 through the bearing 65. Further, the other extension portion 61d rotatably supports the other axle 3B at an inner peripheral part thereof, and an outer peripheral part thereof is rotatably supported by the end wall 42a of the second casing 42 through the bearing 66.

The differential pinion shaft 62 is supported by the differential gear casing body 61a so as to be directed in a direction orthogonal to the axles 3A and 3B, and rotatably supports two differential pinion gears 63, which are bevel gears, inside the differential gear casing body 61a. That is, the differential pinion shaft 62 allows the differential pinion gears 63 to rotate while revolving with the rotation of the differential gear casing 61.

The left and right side gears 64A and 64B are bevel gears, are rotatably supported inside the differential gear casing body 61a so as to mesh with the differential pinion gears 63 from both sides, and are mechanically connected to the left and right axels 3A and 3B through the connecting unit such as the spline. In a state where the differential pinion gears 63 revolve without rotating, for example, during straight running, the left and right side gears 64A and 64B rotate at a constant speed, and the driving rotation is transmitted to the left and right axles 3A and 3B. Furthermore, during curve running or left or right turning, the differential pinion gears 63 rotate, so that the left and right side gears 64A and 64B rotate relative to each other and the difference in rotation between the left and right axles 3A and 3B is allowed.

[Lubrication Function of Pinion Holder]

Next, a lubrication function of the pinion holder 54 will be described.

The pinion holder 54 has a storage space to store lubricating oil splashed from the storage portion 44 of the housing 4 by the second gear 52 or the pinion gear 53. The storage space is the above-described space portion S formed by the cup portion 54c and the one axle 3A, and the lubricating oil splashed by the second gear 52 or the pinion gear 53 flows into the space portion S through communication holes 54f and 54g (which will be described below) communicating with the space portion S.

The lubricating oil flowing into the space portion S is supplied to the above-described bearing 65 which is disposed adjacent to the space portion S for rotatably supporting one end side of the differential gear casing 61, whereby the bearing 65 is properly lubricated. In addition, the lubricating oil is also distributed from the space portion S to the inside of the differential gear system 6 requiring lubrication and the electric motor 2 that needs to be cooled by the lubricating oil. More specifically, the lubricating oil is supplied from the space portion S through the clearance between the axle 3A and the extension portion 61c of the differential gear casing 61 to the inside of the differential gear system 6, and is supplied from the space portion S to the electric motor 2 through the clearance between the axle 3A and the rotor shaft 23.

As illustrated in FIG. 5, the pinion holder 54 includes first guide portions 54i for receiving the lubricating oil, which is splashed by the second gear 52 or the pinion gear 53, on a first face 54h opposed to the pinion gear 53. The first guide portions 54i are protrusions that are formed on both sides of the cup portion 54c and extend linearly toward the cup portion 54c, and guide the received lubricating oil to the cup portion 54c. The communication hole 54f is formed in a connecting portion between the first guide portion 54i and the cup portion 54c, so that the lubricating oil received by the first guide portion 54i is stored in the space portion S through the communication hole 54f.

As illustrated in FIG. 3, the pinion holder 54 includes a second guide portion 54k for receiving the lubricating oil, which is splashed by the second gear 52 or the pinion gear 53, on a second face 54j opposed to the differential gear casing 61 of the differential gear system 6. The second guide portion 54k is a protrusion that is formed above the cup portion 54c and extends in an arc shape below the uppermost fixed portion 54b, and guides the received lubricating oil to the cup portion 54c. The communication hole 54g is formed in a connecting portion between the second guide portion 54k and the cup portion 54c, so that the lubricating oil received by the second guide portion 54k is stored in the space portion S through the communication hole 54g. The communication hole 54g also communicates with the first face 54h of the pinion holder 54.

As illustrated in FIGS. 3 and 4, among the pinion gear supporting portions 54a of the pinion holder 54, the pinion gear supporting portions 54a supporting the two upper pinion gears 53 respectively include pockets 54m that store the lubricating oil at an opening end on the side of the second face 54j opposed to the differential gear casing 61 of the differential gear system 6. The pocket 54m temporality holds the lubricating oil supplied to the pinion gear supporting portion 54a, thereby enabling proper lubrication of the bearing 56.

By the way, some of the lubricating oil supplied from the space portion S to the bearing 65 flows to the outer periphery of the differential gear casing 61 by passing through the bearing 65, and receives a centrifugal force caused by the rotation of the differential gear casing 61 and moves radially outward along the input plate 61b. The input plate 61b of the embodiment includes a third guide portion 61e that guides the lubricating oil moving radially outward along the input plate 61b to the two upper pinion gear supporting portions 54a. The third guide portion 61e is an edge of an annular recess formed on a surface of the input plate 61b opposed to the pinion gear 53, and the lubricating oil moving radially outward along the input plate 61b is guided to the pinion gear supporting portion 54a by the edge formed in a position opposed to the pinion gear supporting portion 54a in the radial direction. Some of the lubricating oil splashed by the second gear 52 also flows in the same manner.

[Dimensional Relation Between Second Gear and Pinion Holder]

A dimensional relation between the second gear 52 and the pinion holder 54 will be described below with reference to FIG. 7.

Figure 7:
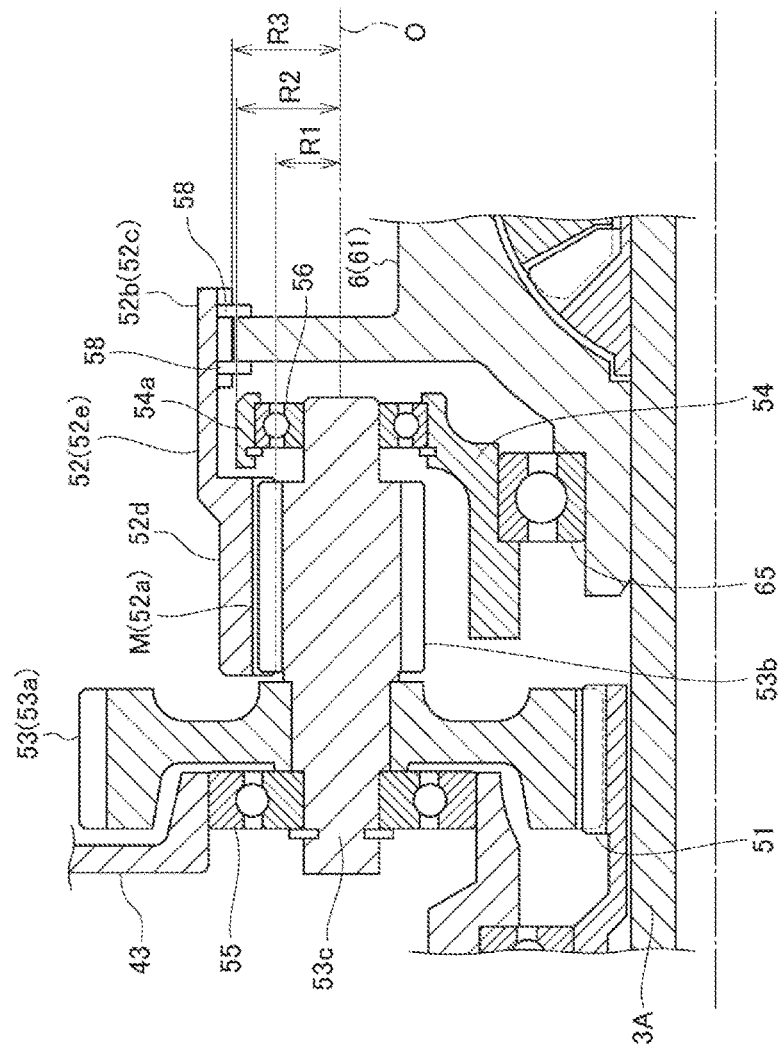
FIG. 7 is an explanatory diagram illustrating a dimensional relation between the second gear and the pinion holder.

As illustrated in FIG. 7, an inner diameter R1 of the second gear 52 (gear portion 52a) in the meshing portion M with the pinion gear 53 (small diameter gear 53b) is set to be equal to or smaller than an outer diameter R2 of the pinion holder 54 (pinion gear supporting portion 54a). The inner diameter R1 of the second gear 52 (gear portion 52a) is a distance from an axial center O of the pinion shaft 53c to the tip (edge) of the gear, and the outer diameter R2 of the pinion holder 54 (pinion gear supporting portion 54a) is a distance from the axial center O of the pinion shaft 53c to the outer peripheral surface of the pinion gear supporting portion 54a. Thus, a deceleration ratio of the second gear 52 is set to be large at the meshing portion M. In addition, this can reduce the size in the radial direction around the pinion gear 53 while improving the degree of freedom in layout around the pinion holder 54. For example, it is possible to make the outer diameter of the second-gear small diameter portion 52d of the second gear 52 small while making it easy to enlarge the bearing 56 and secure a lubrication path around the pinion holder 54.

In the connecting portion 52b between the second gear 52 and the differential gear casing 61, an inner diameter R3 of the second gear 52 is set to be larger than the outer diameter R2 of the pinion holder 54 (pinion gear supporting portion 54a). The inner diameter R3 of the second gear 52 is a distance from the axial center O of the pinion shaft 53c to the tip of the spline tooth. Thus, the pinion holder 54 can be assembled after the second gear 52 is assembled, and the transmission 5 and the differential gear system 6 can be assembled according to assembling procedures to be described below.

[Assembling Procedure of Transmission and Differential Gear System]

As illustrated in FIGS. 8A to 8D, in assembling the transmission 5 and the differential gear system 6 in the manufacturing process of the power system 1, after the first gear 51 is assembled, three pinion gears 53 are first assembled as illustrated in FIG. 8A. Thus, one end of the pinion shaft 53c of the pinion gear 53 is rotatably supported by the partition wall 43 through the bearing 55, and the large diameter gear 53a of the pinion gear 53 meshes with the first gear 51.

Next, as illustrated in FIG. 8B, the second gear 52 is assembled. Thus, the gear portion 52a of the second gear 52 meshes with the small diameter gear 53b of the pinion gear 53.

Next, as illustrated in FIG. 8C, the pinion holder 54 is assembled. Since the pinion holder 54 has the outer diameter R2 smaller than the inner diameter R3 of the second gear 52 in the connecting portion 52b between the second gear 52 and the differential gear casing 61, it can be assembled even after the second gear 52 is assembled. Then, the pinion holder 54 rotatably supports the other end of the pinion shaft 53c through the bearing 56, and is fixed to the partition wall 43 with the bolt 57.

Next, as illustrated in FIG. 8D, the differential gear system 6 is assembled. Thus, one end of the differential gear casing 61 of the differential gear system 6 is rotatably supported by the pinion holder 54 through the bearing 65, and the input plate 61b of the differential gear casing 61 is mechanically connected to the connecting portion 52b of the second gear 52. Reference numeral 58 indicates a clip (retaining ring) for restricting movement of the input plate 61b in the axial direction.

As described above, according to the embodiment, since the pinion holder 54 has the pinion gear supporting portion 54a which is disposed on the side of the differential gear casing 61 of the differential gear system 6 to support the pinion gear 53, relative to the meshing portion M between the second gear 52 mechanically connected to the differential gear casing 61 of the differential gear system 6 and the pinion gear 53, the pinion gear 53 can be appropriately supported. This enables appropriate power transmission from the pinion gear 53 to the second gear 52.

In addition, since the inner diameter R1 of the second gear 52 in the meshing portion M with the pinion gear 53 is equal to or smaller than outer diameter R2 of the pinion holder 54, the deceleration ratio of the second gear 52 can be increased. Further, this can reduce the size in the radial direction around the pinion gear 53 while improving the degree of freedom in layout around the pinion holder 54.

In the embodiment, since the pinion holder 54 for supporting the other end of the pinion shaft 53c is fixed to the partition wall 43 for supporting one end of the pinion shaft 53c, the partition wall 43 has both the support function of the pinion shaft 53c and the support function of the pinion holder 54, so that the components can be used in common and thus the number of components can be reduced.

In the embodiment, since the pinion gear 53 has the large diameter gear 53a and the small diameter gear 53b and the small diameter gear 53b meshes with the second gear 52, enlargement in dimension in the radial direction can be prevented.

In the embodiment, since the inner diameter R3 of the second gear 52 is larger than the outer diameter R2 of the pinion holder 54 in the connecting portion 52b between the second gear 52 and the differential gear casing 61, the pinion holder 54 can be assembled after the second gear 52 is assembled.

In the embodiment, the second gear 52 includes the second-gear large diameter portion 52c constituting the connecting portion 52b with the differential gear casing 61, and the second-gear small diameter portion 52d constituting the meshing portion M with the pinion gear 53, the outer diameter of the second-gear small diameter portion 52d is smaller than that of the second-gear large diameter portion 52c, and thus it is possible to prevent enlargement in dimension in the radial direction around the pinion gear 53. Further, the deceleration ratio of the second gear 52 can be increased at the meshing portion M.

In the embodiment, since the pinion gear 53, the second gear 52, the pinion holder 54, and the differential gear system 6 are assembled in this order after the first gear 51 is assembled, it is possible to improve the degree of freedom in layout around the pinion holder 54 while making it easy to enlarge the bearing 56 and secure a lubrication path.

It is noted that the invention is not limited to the above-described embodiment, but can be appropriately modified and improved, for example.

For example, the pinion holder 54 can select any shape as long as the inner diameter R1 of the second gear 52 at the meshing portion M is equal to or smaller than the outer diameter R2 of the pinion holder 54 (pinion gear supporting portion 54a).

In addition, the number of pinion gears 53 is not limited to three, but may be one, two, or four or more.

The power system 1 may adopt a forced lubrication system using an oil pump instead of or together with the splashing type lubrication system.

The invention claimed is:

1. A power system comprising:
an electric motor that drives a left wheel and a right wheel of a vehicle;

a transmission that is disposed on power transmission paths between the electric motor and the left wheel and between the electric motor and the right wheel; and a differential gear system that distributes output power shifted by the transmission to the left wheel and the right wheel, wherein:

the transmission includes
- a first gear that is mechanically connected to the electric motor,
- a second gear that has a rotation axis in common with the first gear and is mechanically connected to a differential gear casing of the differential gear system,
- a pinion gear that meshes with the first gear and the second gear, and
- a pinion holder that rotatably supports the pinion gear;

the pinion holder has a pinion gear supporting portion which is disposed on a side of the differential gear casing of the differential gear system to support the pinion gear, relative to a meshing portion between the second gear and the pinion gear;

the differential gear casing of the differential gear system has an input plate that extends in a radial direction and is mechanically connected to the second gear;

the pinion gear supporting portion is disposed between the input plate and the meshing portion; and an inner diameter of the second gear at the meshing portion is equal to or smaller than an outer diameter of the pinion holder.

2. The power system according to claim 1, wherein the pinion gear is configured such that one end of a pinion shaft is rotatably supported on a partition wall portion through a first bearing and an other end thereof is rotatably supported on the pinion gear supporting portion of the pinion holder through a second bearing, and the pinion holder is fixed to the partition wall portion.

3. The power system according to claim 1, wherein the pinion gear includes a large diameter gear and a small diameter gear, and
the small diameter gear meshes with the second gear.

4. The power system according to claim 1, wherein the inner diameter of the second gear at a connecting portion between the second gear and the input plate is larger than the outer diameter of the pinion holder.

5. The power system according to claim 4, wherein the second gear includes a second-gear large diameter portion constituting the connecting portion, a second-gear small diameter portion constituting the meshing portion, and a second gear connecting portion connecting the second-gear large diameter portion with the second-gear small diameter portion, and an outer diameter of the second-gear small diameter portion is smaller than an outer diameter of the second-gear large diameter portion.

6. A method of manufacturing a power system, wherein the power system comprises:
an electric motor that drives a left wheel and a right wheel of a vehicle;
a transmission that is disposed on power transmission paths between the electric motor and the left wheel and between the electric motor and the right wheel; and
a differential gear system that distributes output power shifted by the transmission to the left wheel and the right wheel, the transmission comprises:
a first gear that is mechanically connected to the electric motor;
a second gear that has a rotation axis in common with the first gear and is mechanically connected to a differential gear casing of the differential gear system;
a pinion gear that meshes with the first gear and the second gear; and
a pinion holder that rotatably supports the pinion gear, wherein the pinion holder has a pinion gear supporting portion which is disposed on a side of the differential gear casing of the differential gear system to support the pinion gear, relative to a meshing portion between the second gear and the pinion gear, wherein the differential gear casing of the differential gear system has an input plate that extends in a radial direction and is mechanically connected to the second pear, wherein the pinion gear supporting portion is disposed between the input plate and the meshing portion, and wherein the method comprises
assembling the pinion gear, the second gear, the pinion holder, and the differential gear system in this order after assembling the first gear.

* * * * *